United States Patent [19]

Matsuoka et al.

[11] Patent Number: 5,535,387
[45] Date of Patent: Jul. 9, 1996

[54] UNIFORM LOAD DISTRIBUTING METHOD FOR USE IN EXECUTING PARALLEL PROCESSING IN PARALLEL COMPUTER

[75] Inventors: Hidetoshi Matsuoka; Fumiyasu Hirose, both of Kawasaki, Japan

[73] Assignee: Fujitsu Limited, Kanagawa, Japan

[21] Appl. No.: 43,808

[22] Filed: Apr. 7, 1993

[30] Foreign Application Priority Data

Apr. 10, 1992 [JP] Japan ................................... 4-91016

[51] Int. Cl.⁶ ........................................................ G06F 7/00
[52] U.S. Cl. ........................... 395/650; 364/DIG. 1; 364/281; 364/281.3
[58] Field of Search ................................. 395/650, 700; 364/281

[56] References Cited

U.S. PATENT DOCUMENTS

| | | | |
|---|---|---|---|
| 4,394,725 | 7/1983 | Bienvenu et al. | 364/200 |
| 4,920,487 | 4/1990 | Baffes | 364/300 |
| 5,056,000 | 10/1991 | Chang | 364/200 |
| 5,202,987 | 4/1993 | Bayer et al. | 395/650 |
| 5,241,677 | 8/1993 | Naganuma et al. | 395/650 |
| 5,317,734 | 5/1994 | Gupta | 395/650 |
| 5,388,262 | 2/1995 | Hillis | 395/650 |

OTHER PUBLICATIONS

Marc H. Willebeek–Le Mair, Anthony P. Reeves, "Strategies For Dynamic Load Balancing on Highly Parallel Computers", 1993 IEEE.

Anne Dinning, "A Survey of Synchronization Methods for Parallel Computers", 1989 IEEE.

J. F. Baker, D. E. Holst, "Load Balancing Control for Multiprocessors", IBM Tech. Discl. Bull. vol. 20 No. 3, Aug. 1977.

Primary Examiner—Kevin A. Kriess
Attorney, Agent, or Firm—Staas & Halsey

[57] ABSTRACT

A uniform load distributing method for use in executing a parallel processing in a parallel computer for executing a plurality of processings in parallel manner. The parallel computer including a plurality of processors for executing individual processings, a network for conducting communication between the plurality of processors, and a synchronizing mechanism for issuing an execution start command for a next step to all the processors under the condition that a completion information of the processing is received from all the processors and the inter-processor communication in the network has been completed. All the processors are synchronized with one another in each step and process calculation of a multitude of individual processings in parallel manner by executing by the respective processors only the individual the individual processings processings whose output data in a current step are used immediately in a next step when all the data necessary for the multitude of individual processings are ready in the step wherein the respective processors execute the processings; informing of the synchronizing mechanism the completion of the execution, immediately after the execution has been completed, to the synchronizing mechanism; and executing, during a waiting time until the execution start command for the next step is given from the synchronizing mechanism, by the respective processors, the individual processings whose input data required for the execution are ready and whose output data are used at an earliest timing after the next step.

23 Claims, 14 Drawing Sheets

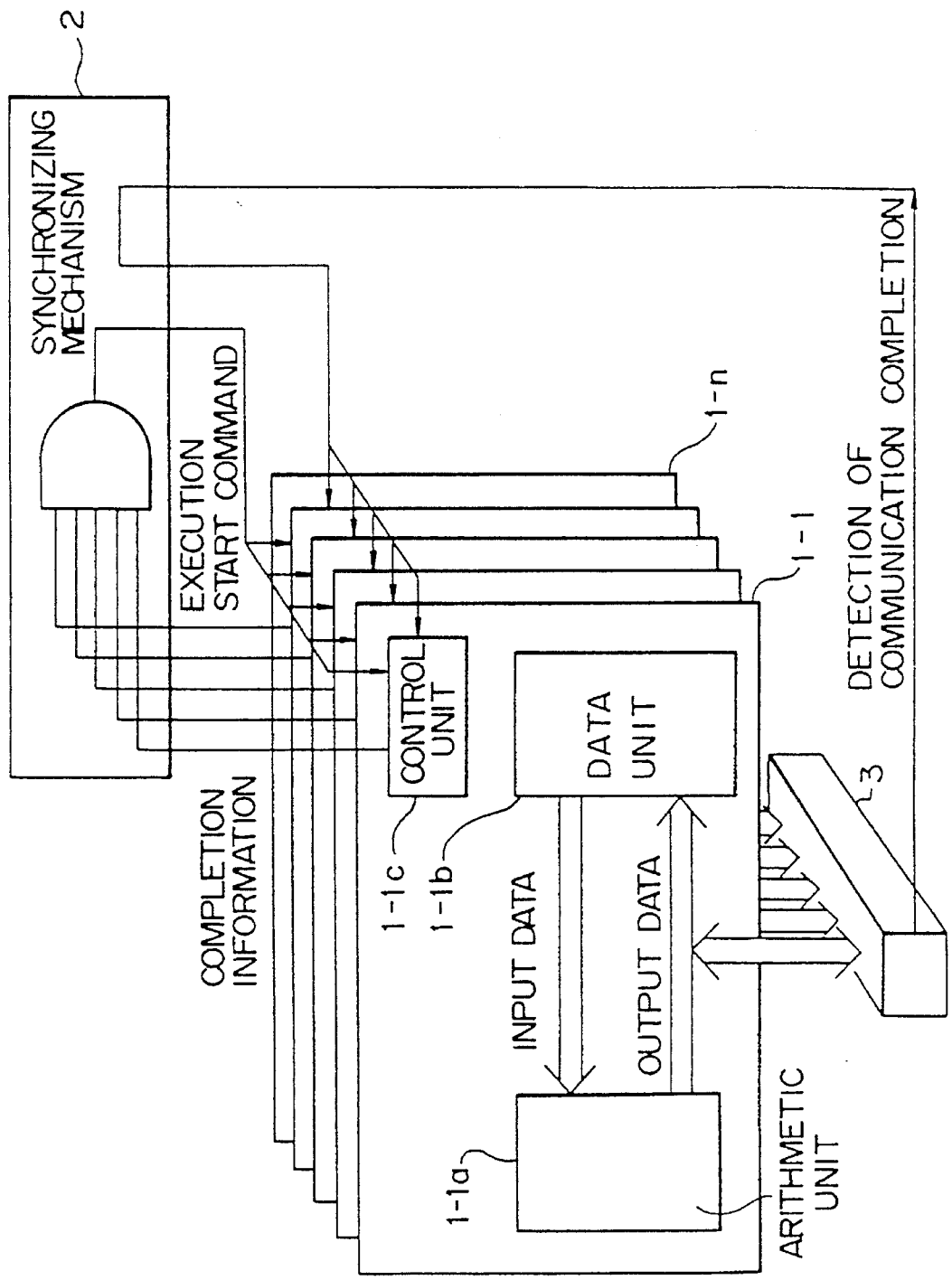

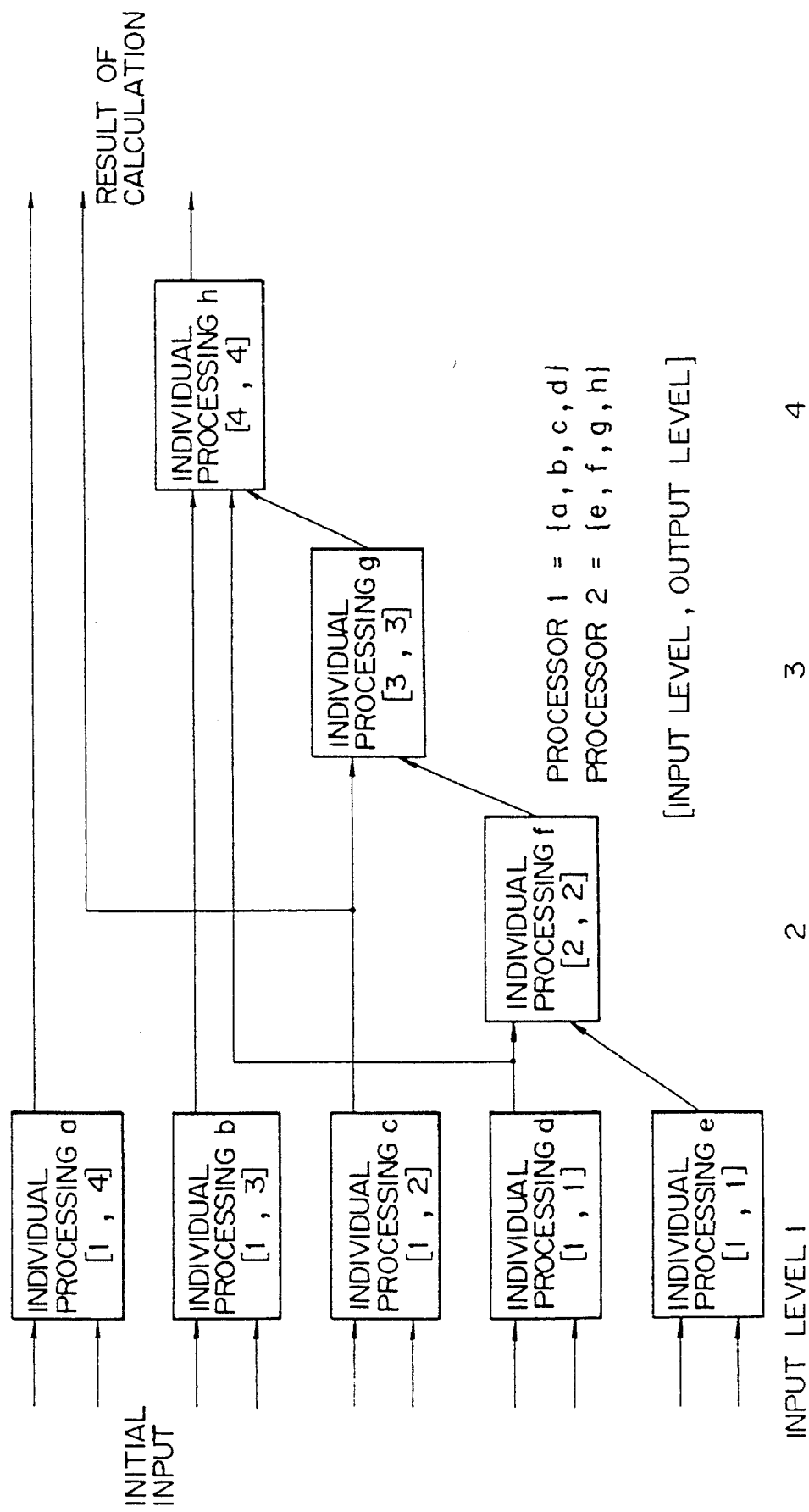

Fig. 4(A)

| EXECUTION TIME | 1 | 2 | 3 | 4 | 5 | 6 | 7 |
|---|---|---|---|---|---|---|---|
| PROCESSOR 1 | a | b | c | d |   |   |   |
| PROCESSOR 2 | e |   |   |   | f | g | h |
| INPUT LEVEL | 1 |   |   |   | 2 | 3 | 4 |

Fig. 4(B)

| EXECUTION TIME | 1 | 2 | 3 | 4 |
|---|---|---|---|---|
| PROCESSOR 1 | d | c | b | a |
| PROCESSOR 2 | e | f | g | h |
| OUTPUT LEVEL | 1 | 2 | 3 | 4 |

UNIFORM LOAD DISTRIBUTING METHOD FOR USE IN EXECUTING PARALLEL PROCESSING IN PARALLEL COMPUTER

BACKGROUND OF THE INVENTION

1. Field of the Invention

This invention relates to a load uniforming method for use in executing a parallel processing in a parallel computer for executing a plurality of processings in a parallel manner and, particularly to a load uniforming method for use in executing a parallel processing which makes loads uniform on respective processors by allotting to the respective processors individual processings to be executed in a parallel manner so as to shorten a waiting time required for all the processors to synchronize with one another in each step.

2. Description of the Related Art

In a parallel computer, it is necessary to divide a calculation into several steps and to synchronize all the processors with one another in each step lest the calculation results of the respective processors contradict one another.

In view of this, other processors are required to wait until the slowest processor finishes a calculation, and accordingly a calculation speed of the computer is determined by that of the slowest processor. Further, even if a total calculation time is made uniform among the respective processors, some processors are caused to wait since the calculation times of the respective processors are nonuniform in each step. This can result in a long overall calculation time.

SUMMARY OF THE INVENTION

The present invention aims to solve the above-mentioned drawbacks in the prior art.

An object of the present invention is to provide a load uniforming method capable of shortening the waiting time for synchronization and improving calculation speed in a parallel processing in a parallel computer in which a synchronization mechanism detects that a range of information processing has been completed by all the processors, and all the processors are given a command to start the execution of a next step. Multiple calculations are thus carried out by synchronizing all the processors with each other.

In accordance with an aspect of the invention, there is provided a uniform load distributing method for use in executing parallel processing in a parallel computer, in the parallel computer including a plurality of processors for executing individual processings, a network for conducting communication between the plurality of processors, and a synchronizing mechanism for issuing an execution start command for a next step to all the processors under the condition that a completion information of the processing is received from all the processors and the inter-processor communication in the network has been completed, to synchronize all the processors with one another in each step and process calculation of a multitude of individual processings in a parallel manner, the method comprising the steps of: executing by the respective processors only the individual processings whose output data in a current step are used immediately in a next step when all the data necessary for the multitude of individual processings are ready in the step wherein the respective processors execute the processings; informing the completion of the execution, immediately after the execution has been completed, to said synchronizing mechanism; and executing, during a waiting time until the execution start command for the next step is given from said synchronizing mechanism, by the respective processors, the individual processings whose input data required for the execution are ready and whose output data are used at an earliest timing after the next step.

BRIEF DESCRIPTION OF THE DRAWINGS

FIG. 1 is a block diagram showing a configuration of a parallel computer in the prior art.

FIG. 3 is a block diagram showing a processing procedure in the parallel computer in consideration of input and output levels and a mutual dependency of individual processings.

FIG. 4(A) is a view showing the prior art level sorting method.

FIG. 4(B) is a view showing execution in the present invention.

PREFERRED EMBODIMENTS OF THE INVENTION

Figure 2A:
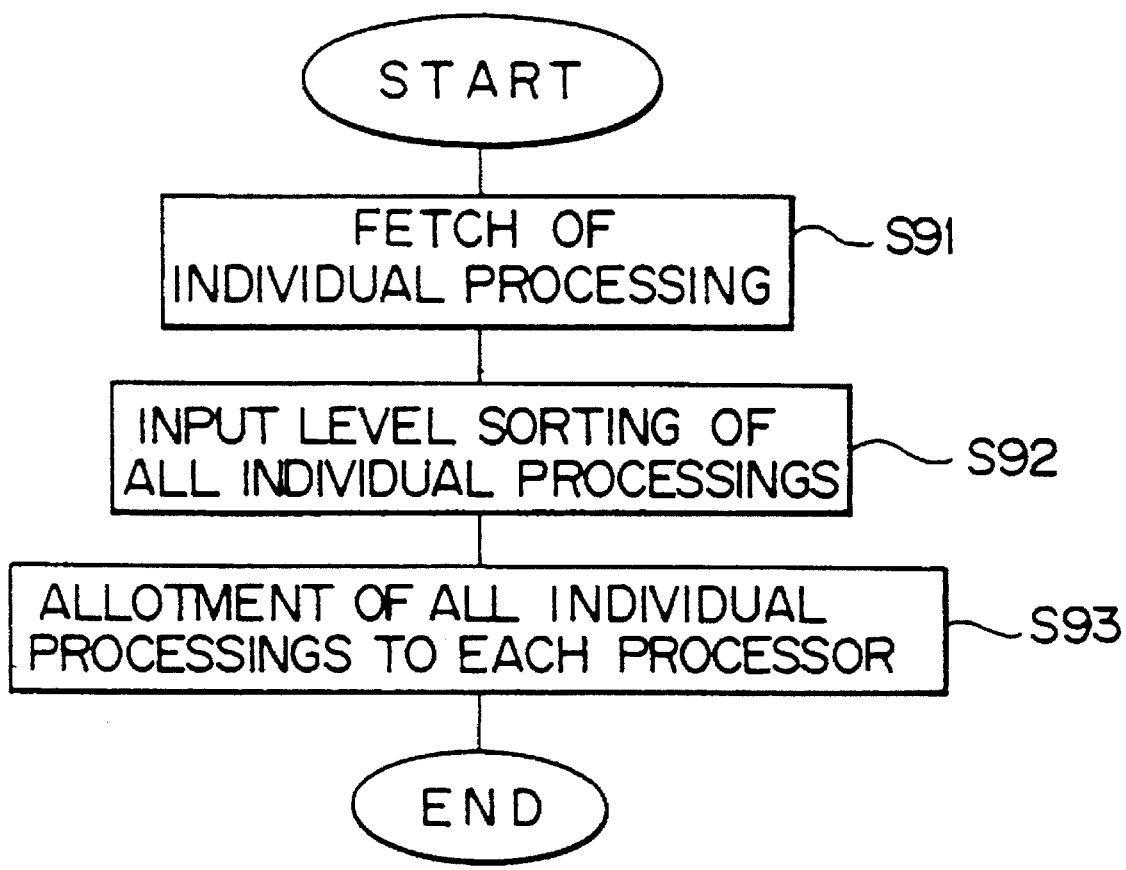
FIG. 2(A) is a flowchart of preprocessing in the prior art and FIG. 2(B) is a flowchart of processing in each processor in the prior art.

An embodiment of the present invention will be described after suitably describing a parallel processing executed in a parallel computer according to the prior art.

FIG. 1 is a diagram showing the construction of a parallel computer.

In this figure, a group of processors 1-1 to 1-n each have an arithmetic unit, 1-1-a, a data unit 1-1b, a control unit 1-1c. Further, a synchronizing mechanism, 2 and communication network 3 is provided between processors or an inter-processor communication network (hereinafter referred to as a network). The arithmetic unit 1-1a carries out calculations based on an input data given from the data unit 1-1b in accordance with a control of the control unit 1-1c and outputs the calculation result to the data unit 1-1b and the network 3.

The processors 1-1 to 1-n are constructed identically to the processor 1-1. In this case, the n processors are arranged in parallel.

The synchronizing mechanism 2 is adapted to synchronize the respective processors 1-1 to n-1 with one another. When the operations of the processors 1-1 to 1-n are completed and the network 3 finishes communicating the data between the processors, commands representative of the start of the execution of a next processing are given to the control units 1-1c of the processors 1-1 to n-1.

The network 3 transfers the processing results between the processors 1-1 to n-1.

In the case where the arithmetic operation is carried out by the above parallel computer, calculation is divided into several steps which are allotted to the processors 1-1 to n-1.

The processors 1-1 to n-1 carry out the calculations allotted thereto in accordance with the control of the controllers 1-1c. Upon the completion of the calculation, the processors 1-1 to n-1 inform the synchronizing mechanism 2 of its completion and transfer the calculation result to the other processors through the network 3.

The synchronizing mechanism 2 gives a command representative of the start of the execution of the next calculation to the processors 1-1 to n-1 when the completion information is output from all the processors 1-1 to n-1, or the network 3 becomes empty of data and the completion of the communication is detected, thereby starting the next calculation.

FIG. 3 is a diagram showing a relationship of mutual dependency among the individual processings executed by the respective processors in the above parallel processing. Specifically, FIG. 3 shows a case where a repeat calculation is divided into individual processings a to h which are executed by two processors 1 and 2.

Out of the individual processings, the individual processings a to e are those in which the calculation is carried out in accordance with an initial input signal, and the individual processing f is the one in which the calculation is carried out using the results of the individual processings d and e as inputs.

Likewise, the individual processing g is the one in which the calculation is carried out using the results of the individual processings c, f, and the individual processing h is the one in which the calculation is carried out using the results of the individual processings b, d, g.

As shown in FIG. 3, since the output data of the individual processings are used as input data for the next individual processings, the calculation cannot be started until all the input data are ready if a certain individual processing is taken note of.

Thus, in the parallel computer, the calculation proceeds while synchronizing the processors with one another in each step in order to receive the input data for these individual processings from the other processors and to transfer the output data to the other processors.

In the parallel computer of FIG. 1, the output data of the processors 1-1 to n-1 are transferred between the processors through the network 3, and the processors are synchronized with one another through the synchronizing mechanism 2.

Incidentally, when the individual processings shown in FIG. 3 are executed by the parallel computer according to the prior art, levels are affixed to the individual processings in the order that the inputs of the individual processings are set, and the calculation proceeds while the processors are synchronized with one another for each level (hereinafter, this processing method is referred to as a level sorting method).

In FIG. 3, the levels of the individual processings, for example, the levels of the individual processing a are determined as follows. Since the input data of the individual processing a is an initial input and the output data thereof is a final calculation result, input and output levels are respectively 1, 4. If the input level=i and the output level=j are represented as [i, j], the levels of the individual processing a are represented as [1, 4] as shown in FIG. 3.

Likewise, the levels of the individual processing f is [2, 2] since the input level thereof is 2 and the output level thereof is 2. Hereafter, the levels of the individual processings a to h are determined as shown in FIG. 3 in a similar manner.

Generally, in the level sorting which is carried out when all the input data are ready, the individual processing which can be executed using only the initial data has the input level 1 when the level of the initial data is 0. Likewise, the individual processing which requires the calculation result of the input level (i−1) and can be executed using only the calculation result of the input level (i−1) or smaller. The initial data is an input which is required to carry out a series of calculations and is given initially.

In the level sorting which is carried out depending upon when the output data is required in the other individual processings to be described later, the output level of the individual processing is set at the minimum input level minus 1 out of all the individual processings which use the calculation result of this individual processing.

For instance, in the case where the output data of a certain individual processing A is used in the individual processings having the input levels 3, 4 and 5, the output level of the individual processing A is 2.

There is always established a relationship: output level≧input level.

Figure 2B:
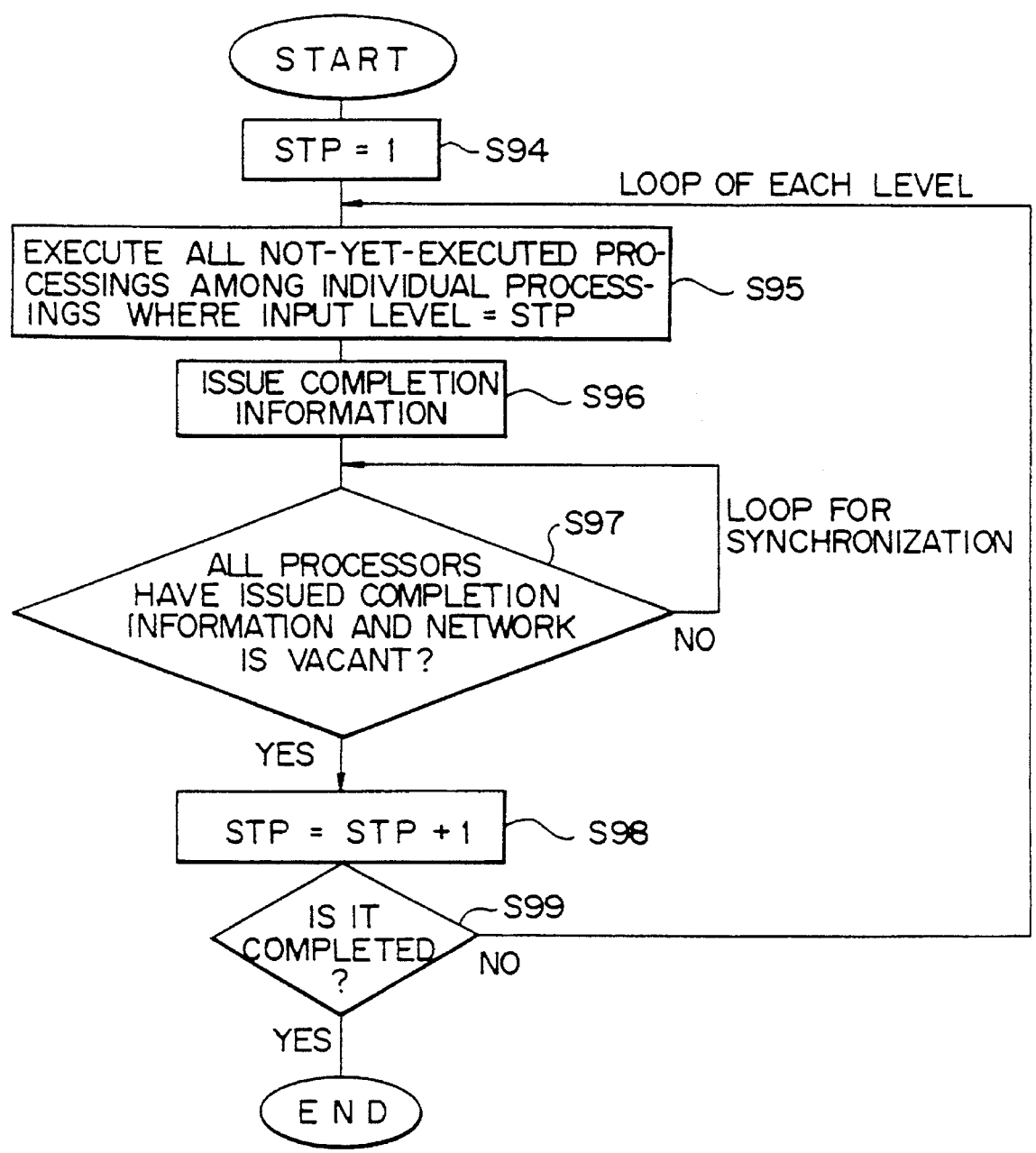

A conventional parallel processing is executed as shown in FIG. 2, after setting the levels in the individual processings as described above. FIG. 2(A) shows the preprocessing while FIG. 2(B) shows the processing executed in the respective processors.

In Step S91 of FIG. 2(A), the individual processings are read. In Step S92, the input levels of all the individual processings are sorted. In Step S93, all the individual processings are allotted to the respective processors.

In the respective processors, STP is initialized to 1 in Step S94, as shown in FIG. 2(B). In Step S95, out of the individual processings whose input levels= STP, all the unexecuted processings are executed. Subsequently, the completion information is issued in Step S96 and it is determined whether all the processors have issued the completion information and the network has become empty of data in Step S97.

In the case where the discrimination result is in the negative in Step S97, this routine waits in this step until the above conditions are satisfied.

When the above conditions are satisfied, this routine proceeds to Step S98 in which STP is incremented by one. In Step S99, it is determined whether the individual processings have been completed. If the individual processings have not been completed, the routine returns to Step S95 to repeat the above operations.

If it is determined that the individual processings have been completed in Step S99, the parallel processing is completed.

Here, it is assumed that two processors take partial charge of the individual processings, as shown in FIG. 3, as described above and the individual processings a, b, c, d are allotted to the processor 1 while the individual processings e, f, g, h are allotted to the processor 2. In this case, if the individual processings of FIG. 3 are level sorted in the order the inputs are set, there are five individual processings having the input level 1, one individual processing having the input level 2, one individual processing having the input level 3, and one individual processing having the input level 4.

If the parallel processing is executed in accordance with the procedure shown in FIG. 2(B), while synchronizing the processors with each other for each input level on the assumption that it takes one unit time to execute one individual processing, the processings executed in the processors 1 and 2 are as shown in FIG. 4(A).

More specifically, the processors 2, 1 are caused to wait during unit times 2, 3, 4 and during unit times 5, 6, 7, respectively, since there is no individual processing available. This is because the routine recycles a loop for the synchronization, as shown in FIG. 2.

In this example, the individual processings which need to be executed to start the individual processing having the input level 2 are only the individual processings d and e. The processor 2 is caused to wait by the processor 1 for the synchronization despite the fact that the individual processing of the level 2 can be executed without execution of the individual processings a, b and c.

Thus in the conventional level sorting method, a waiting time of the other processor(s) is extended more than necessary, thereby slowing the processing speed.

The present invention is devised in view of the aforementioned problems in the prior art, and an object thereof is to provide a load uniforming method capable of shortening a waiting time for the synchronization and improving a calculation speed in a parallel processing in a parallel computer which includes a synchronizing mechanism for detecting that the completion of processing has been informed from all the processors and giving to all the processors a command to start the execution of a next step, and proceeding with the calculations of a multitude of individual processings while synchronizing all the processors with one another for each step.

Figure 5:
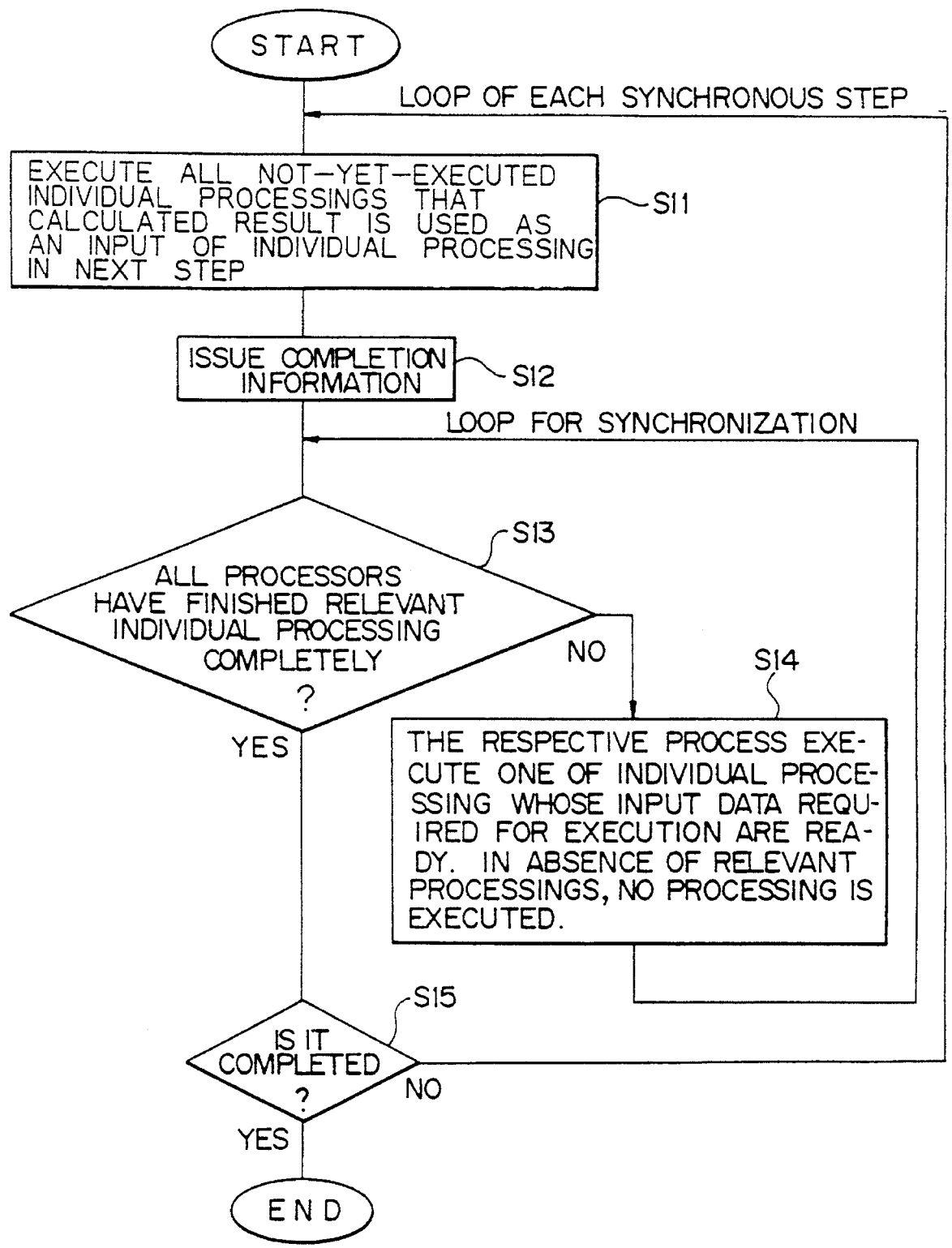
FIG. 5 is a flowchart showing a uniform load distributing method in accordance with the present invention.

FIG. 5 is a flowchart showing the basic feature of the invention. The present invention in accordance with a first preferred embodiment is constructed as shown in FIG. 5 in order to solve the aforementioned problems. According to the first preferred embodiments of the invention, a parallel computer includes a plurality of processors for executing individual processings, a network for conducting communication between the plurality of processors, and a synchronizing mechanism for issuing an execution start command for a next step to all the processors under the condition that a completion information of the processing is received from all the processors and the inter-processor communication in the network has been completed, to synchronize all the processors with one another in each step and process calculation of a multitude of individual processings in parallel manner. The respective processors execute only the individual processings whose output data in a current step are used immediately in a next step when all the data necessary for the multitude of individual processings are ready in the step wherein the respective processors execute the processings (Step S11), and the completion of the execution is informed to the synchronizing mechanism (Step S12).

During a waiting time, until the execution start command for the next step is given from the synchronizing mechanism, the respective processors execute the individual processings whose input data required for the execution are ready and whose output data are used at an earliest timing after the next step (Step S14). This shortens the waiting times of the processors for the synchronization and to make loads between the processors in each synchronizing step uniform.

According to a second preferred embodiment of the present invention, when the respective individual processings are level sorted when the input data necessary for these processings are ready and the output data of the individual processings are level sorted when they are required for other processings to thereby cause the respective processors to execute the individual processings using the results of level sorting, each processor calculates a current step number by counting the execution start command from the synchronizing mechanism in each processor and executes only the individual processings whose output levels are equal to the calculated current step number.

During a waiting time, to wait for the other processors to complete the execution of the individual processings for the synchronization, the individual processings whose input levels are not larger than the current step number and whose output levels are larger than the current number steps are executed. This minimizes a time during which the other processors are caused to wait for the synchronization and to make the loads between the processors in each synchronizing step uniform.

According to a third preferred embodiment of the present invention, the individual processings are allotted to the respective processors by level sorting the respective individual processings when the input data necessary for these processings are ready and also by level sorting the output data of the individual processings when they are required for other processings, thereby estimating execution times of all the individual processings to be executed. Based on the estimated execution times of the individual processings, out of the individual processings whose output levels are equal to the step number, the individual processing which is not scheduled yet is scheduled as an individual processing in each processor in each step. In addition, an overall execution time in the step is estimated.

In each step, the waiting times of the respective processors for the synchronization in each step are calculated based on a maximum value of the estimated overall execution time of all the processors. Out of the individual processings whose input levels are not larger than the step number and whose output levels are larger than the step number, the individual processings which are not scheduled yet are scheduled as individual processings for this step in the processors during the waiting times.

The scheduled individual processings are executed by the processors while synchronizing the processors in each step, thereby minimizing the time to cause the other processors to wait for the synchronization and making the loads between the processors uniform in each synchronizing step.

According to a fourth preferred embodiment of the present invention, a processing for one cycle is taken from the individual processing which is executed repeatedly in the case where an individual processing to be executed repeatedly is found in an overall calculation to be processed.

The processing taken for one cycle is redefined as an individual processing. Assuming that there are the newly defined individual processings corresponding to the number of repetitions, a plurality of individual processings are executed to thereby execute the individual processings which are executed repeatedly.

According to a fifth preferred embodiment of the present invention, as in the fourth aspect thereof, in taking the processing for one cycle from an individual processing to be executed repeatedly in the entire calculation to be processed, the individual processing to be executed repeatedly is developed into individual processings corresponding to the number of repetitions to be copied.

By executing the plurality of copied individual processings, the individual processing to be executed repeatedly is executed.

According to a sixth preferred embodiment of the present invention, the individual processing to be executed repeatedly is defined as an individual processing in the case where the individual processing to be executed repeatedly is found in the entire calculation to be processed.

By executing the newly defined individual processing only once, the individual processing to be executed repeatedly is executed.

According to a seventh preferred embodiment of the present invention, in the case where the individual processing to be executed repeatedly is found in the entire calculation to be processed, the processing to be executed repeatedly is divided into a suitable number of processings and the divided repeat processings are defined as a plurality of new individual processings.

By executing the plurality of newly defined individual processings, the individual processing to be executed repeatedly is executed.

According to an eighth preferred embodiment of the present invention, a plurality of individual processings having a short execution time are taken from the individual processings in the entire calculation to be processed.

The plurality of individual processings taken are defined and executed as an individual processing in a unit so as to be even with the execution times of the other individual processings. This is designed to make the execution times of the individual processings even to be executed and to shorten the waiting time to wait for the other processors to complete the execution for the synchronization.

According to a ninth preferred embodiment of the present invention, the individual processing having a long execution time is taken from the individual processings in the entire calculation to be processed.

The individual processing taken is divided into a plurality of processings in a unit so as to be even with the execution times of the other individual processings. The plurality of divided processings are defined and executed as a plurality of individual processings, thereby making the execution times of the individual processings to be executed even, and shortening the waiting time to wait for the other processors to complete the execution for the synchronization.

According to a tenth preferred embodiment of the present invention, there is provided a means for detecting whether a data of the designated output level is transferred in the network for conducting the communication between the plurality of processors.

The execution of the next step is started under the condition that completion information of the processing from all the processors is ready and no data of the designated output level is transferred in the network.

According to an eleventh preferred embodiment of the present invention, there is provided a means for detecting whether data of the designated output level is transferred in a pipe-line system in executing the individual processing in a parallel manner in a pipe-line type parallel computer.

The execution of the next step is started under the condition that no data of the designated output level is transferred in the pipe-line system.

In the first to third embodiments of the invention, the processors are synchronized with one another to proceed with the calculation processing under the condition that the execution of all the individual processings whose output data are required in a next processing step are completed out of the individual processings whose input data are ready.

Accordingly, even a processor which has many individual processings and has to cause the other processors to wait, executes only the individual processings minimally required to start the next processing, thereby shortening the time that the other processors are caused to wait.

The processors caused to wait for the synchronization execute the individual processings whose output are needed immediately, utilizing their waiting times. This eliminates the unnecessary waiting time of the processor to shorten the processing time.

Particularly in the second embodiment, it is not necessary to estimate the time to execute the individual processing in advance. Even if the calculation time varies, the order of the individual processings is changed accordingly. Thus, the waiting time of the processing can be shortened more than in the construction according to the third aspect.

Further in the third embodiment, the execution times of all the individual processings are estimated and the order thereof is scheduled. Accordingly, this can be carried out using a conventional parallel computer as it is.

In the case where the individual processings executed by the processors include a processing to be executed repeatedly, the repeatedly executed processing is defined as a proper unit of individual processing by developing or dividing the same as in the fourth to seventh aspects.

The time to wait for the other processors to complete the execution for the synchronization can be shortened by uniting or dividing the individual processings to make the execution times of the individual processings to be executed evenly with those of the other individual processings.

In the tenth embodiment, there is provided a means for detecting whether the data of the designated output level is transferred in the network for conducting the communication between the plurality of processors. Accordingly, the execution of the next step can be started without waiting for the network 3 to become empty even if the network 3 includes the individual processing of the different output level, with the result that the calculation time can be improved.

In the eleventh embodiment, there is provided a means for detecting whether the data of the designated output level is transferred in the pipe-line system in executing the individual processings in a parallel manner by the pipe-line type parallel computer. Accordingly, the execution of the next step can be started without waiting for the pipe-line system to become empty even if the pipe-line system includes the individual processing of the different output level, with the result that the calculation time can be improved.

Figure 6A:
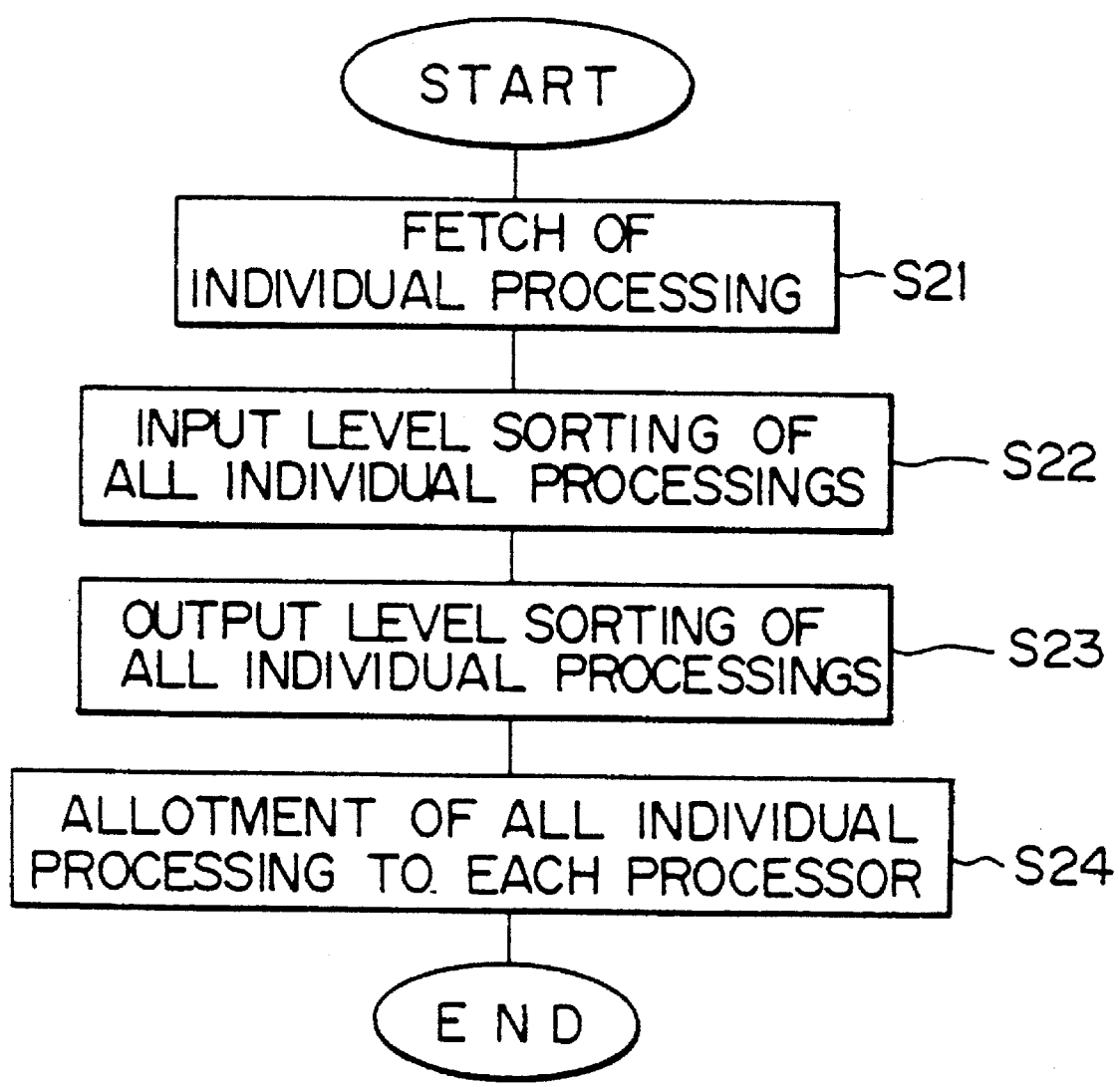
FIG. 6(A) is a flowchart showing a preprocessing in a first embodiment in accordance with the present invention.
Figure 6B:
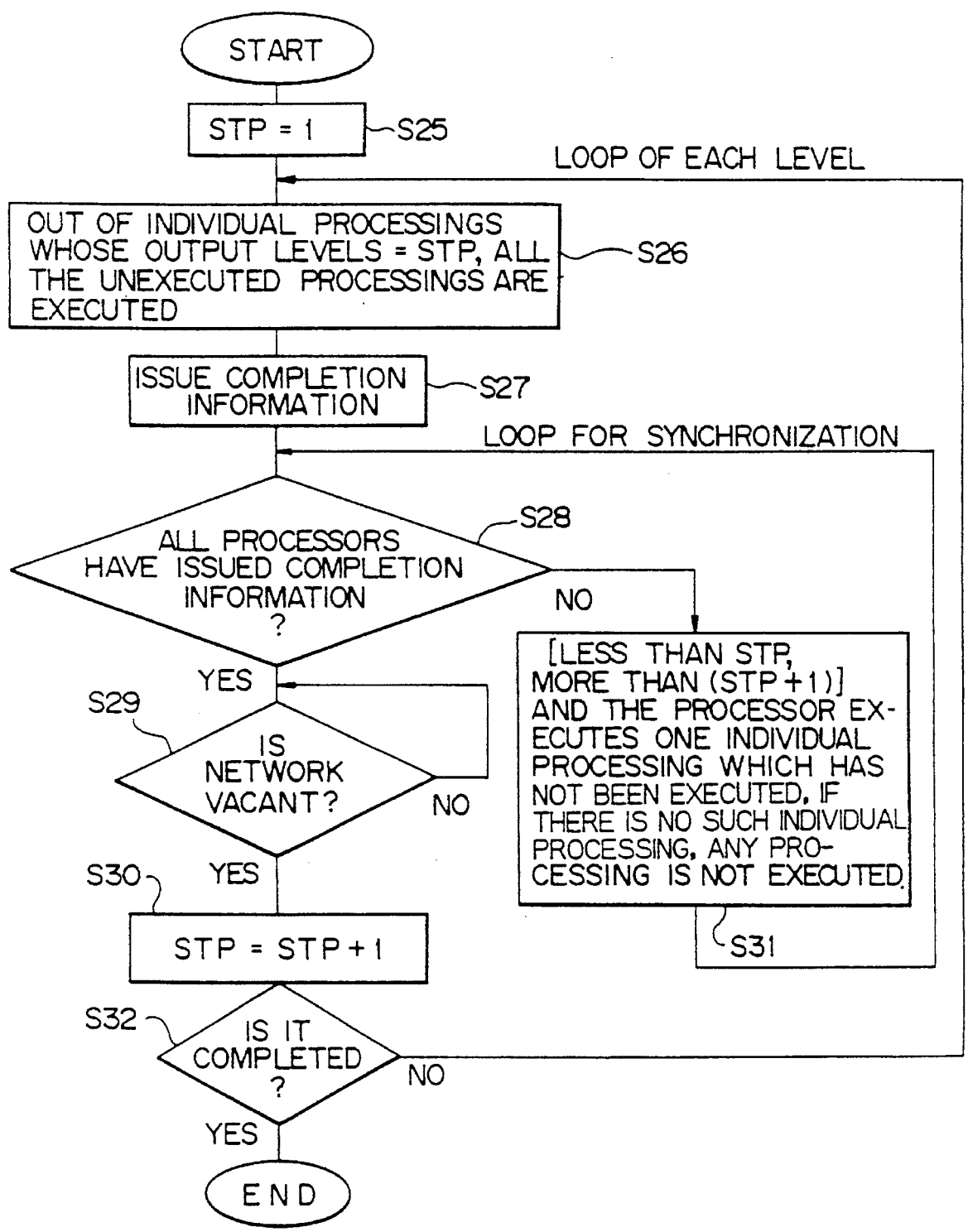
FIG. 6(B) is a flowchart showing the processing in each processor in a first embodiment.

FIG. 6 is a flowchart showing a first embodiment of the invention. FIG. 6(A) shows a preprocessing, and FIG. 6(B) shows a processing executed in each processor.

This embodiment will be described with reference to FIGS. 6(A) and 6(B).

In the preprocessing as shown in FIG. 6(A), individual processings are read in Step S21; all the individual processings have input levels thereof sorted in Step S22; and all the individual processings have output levels thereof sorted in Step S23.

Subsequently, in Step S24, all the individual processings are allotted to the respective processors so that an overall load becomes as uniform as possible.

In the example of FIG. 3, when the individual processings are sorted based on the input and output levels, there are two each of individual processings having the output level 1, 2, 3, 4. Further, the individual processings a, b, c and d are allotted to the processor 1 and the individual processings e, f, g and h are allotted to the processor 2.

In the processing, as shown in FIG. 6(B), as executed in each processor, STP is initialized at 1 in Step S25. In Step S26, out of the individual processings whose output levels= STP, all the unexecuted processings are executed.

In the example of FIG. 3, the individual processings having the output level 1 are the individual processings d and e. These individual processings are first executed in the processors 1 and 2.

Upon the completion of the execution of the processings, the completion information is issued from the respective processors in Step S27. In Step S28, it is determined whether all the processors have issued the completion information.

Unless all the processors have issued the completion information, the routine proceeds to Step S31, in which the processor having issued the completion information executes one individual processing [$\geq$STP, $\leq$STP+1] which has not been executed yet. If there is no such individual processing, no processing is executed.

In Step S31, the individual processing having an input level of 1 or smaller and the output level of 1+1=2 or larger, i.e., [$\geq$1, $\leq$2], is executed in the case of STP=1. However, in the example of FIG. 3, Step S29 follows since the processors 1 and 2 have executed the individual processings d and e, and issued the completion information.

In Step S29, it is determined whether the network is empty. If the network is not empty, the routine waits until the network becomes empty and then proceeds to Step S30 in which STP is incremented by one.

In Step S32, it is determined whether the parallel processing has been completed. Unless the parallel processing has been completed, this routine returns to Step S26 and the above operations are repeated to execute the individual processing of STP=2, i.e., of the output level 2.

In the example of FIG. 3, the individual processings c and f having the output level 2 are executed. Likewise, the processings having the output levels 3, 4 are executed sequentially. The order in which the individual processings are executed is as shown in FIG. 4(B).

In this embodiment, the processors are synchronized according to whether the individual processing whose output data is used in the processing of a next step has been completed as described above unlike the prior art in which the processors are synchronized based on the input levels. While one processor is waiting for the other processor to complete the execution for this synchronization, the one processor executes the individual processing [$\geq$i, $\leq$i+1] which does not use the output data in the processing of a next step. In this way, the waiting time of the processors is utilized effectively.

Thus, the unnecessary waiting time of the processors can be shortened greatly as shown in FIG. 4(B) compared to the prior art shown in FIG. 4(B).

In order to execute the above processing, it is sufficient to provide a function of selecting and executing the individual processing [$\geq$STP, STP] or [$\geq$STP, $\leq$STP+1].

Further, according to the first preferred embodiment, it is not necessary to pre-estimate a time required for the individual processing. Even if the calculation time varies, the order in which the individual processings are executed changes accordingly. Thus, this embodiment is capable of shortening the waiting time of the processors more than a second embodiment to be described later.

In a loop processing for the synchronization in the foregoing embodiment, it is better to execute the corresponding individual processings from the one having the smallest output level if possible. It takes time for the last output data to reach the other processor following the detection of the processing completion information from all the processors. Accordingly, the execution of the next step must be started after the network becomes empty.

Figure 7A:
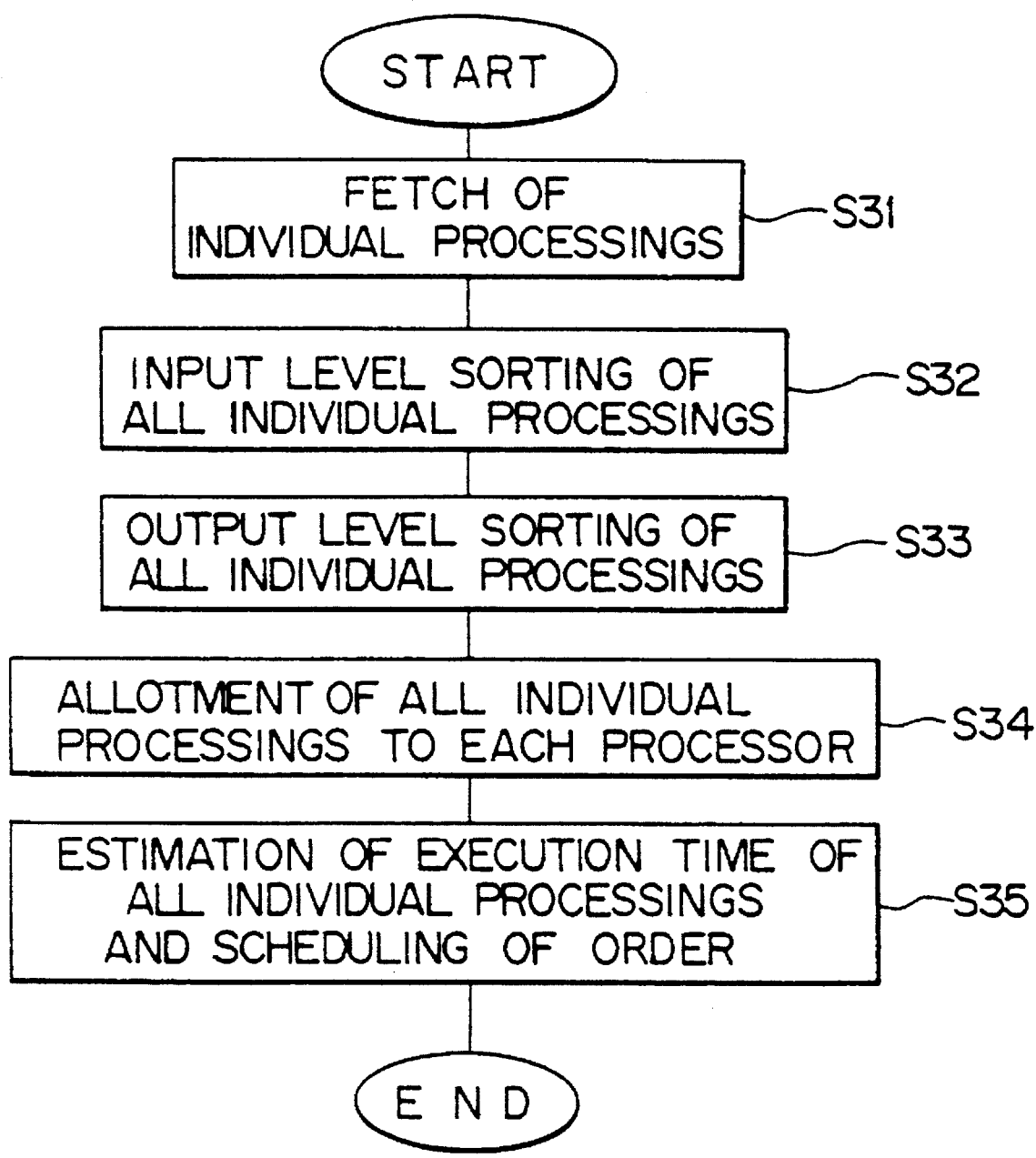
FIG. 7(A) is a flowchart showing a preprocessing in a second embodiment in accordance with the present invention.
Figure 7B:
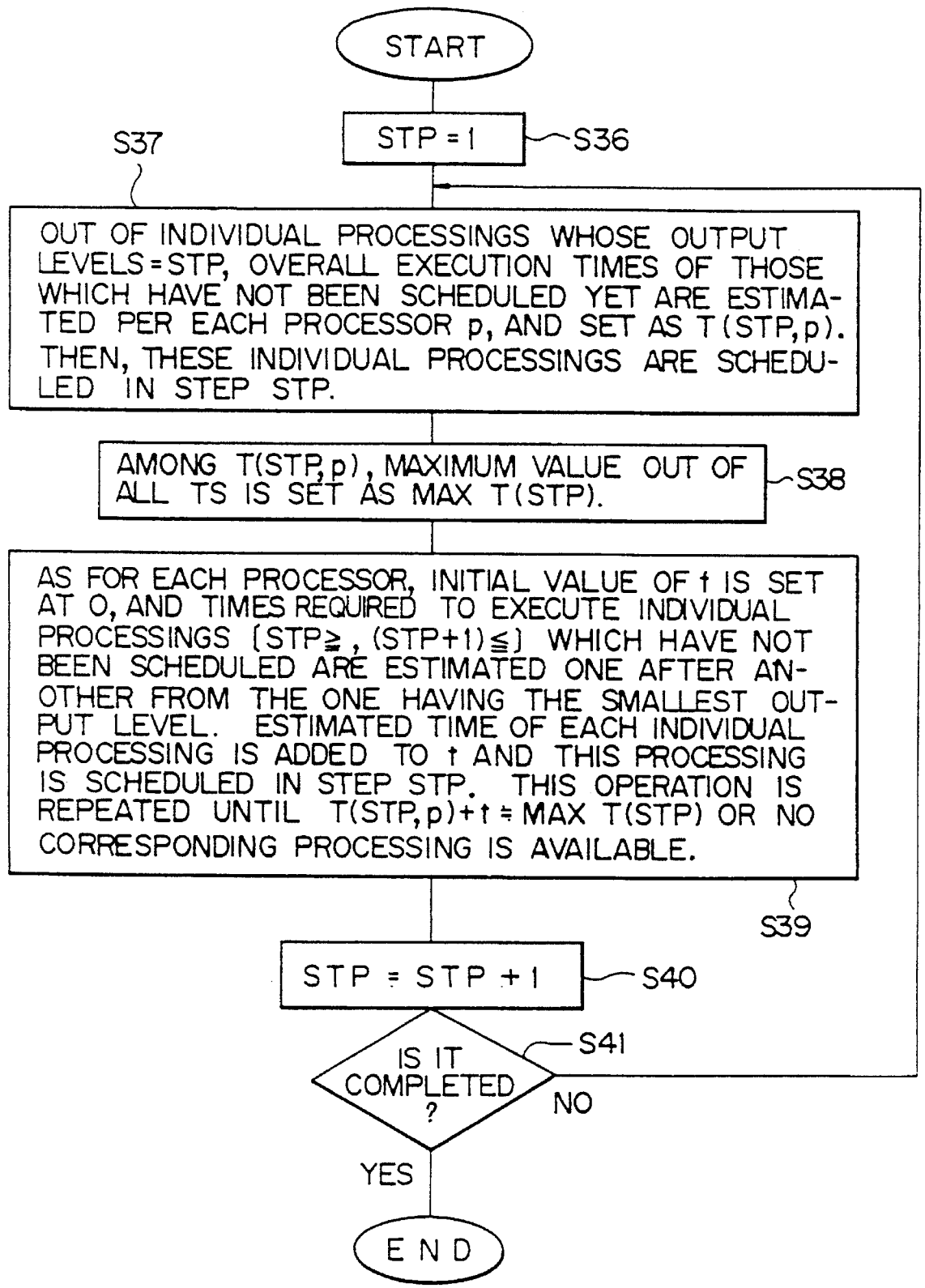
FIG. 7(B) is a flowchart showing an estimation of the execution time of individual processings in a step S35 in FIG. 7(A) and a scheduling of order.

FIG. 7 shows a second preferred embodiment of the invention. FIG. 7(A) shows a preprocessing while FIG. 7(B) shows a processing executed in Step S35 of the preprocessing shown in FIG. 7(B) in which execution times of the individual processings are estimated and the order is scheduled.

In this embodiment, a flowchart of the individual processing executed in each processor is identical to the one shown in FIG. 2(B) except that the processors are synchronized based on the output levels.

In the preprocessing of FIG. 7(A), individual processings are read in Step S31. Then, all the individual processings have input levels thereof sorted in Step S32. Thereafter, all the individual processings have output levels thereof sorted in Step S33, and all the individual processings are allotted to the respective processors in Step S34.

Subsequently, in Step S35, the execution times of all the individual processings are estimated and the order is scheduled as shown in FIG. 7(B).

In FIG. 7(B), STP is initialized at 1 in Step S36. In Step S37, out of the individual processings whose output levels= STP, overall execution times of those which have not been scheduled yet are estimated and set as T(STP, p). Then, these individual processings are scheduled in a step STP.

In Step S38, out of all T(STP, p), the one having a maximum value is set as maxT(STP).

Subsequently, in Step S39, an initial value of t is set at 0, and times required to execute the individual processings [$\geq$STP, $\leq$STP+1] which have not been scheduled are estimated one after another from the one having the smallest output level. The estimated time of each individual processing is added to t, and this processing is scheduled in the step STP. This operation is repeated until T(STP, p)+t=maxT(STP) or no corresponding processing is available.

In Step S40, STP is incremented by one. In Step S41, it is determined whether the processing has been completed. If the processing has not been completed, this routine returns to Step S37 to repeat the above operations.

In this embodiment, the waiting time of each processor is shortened by scheduling the respective individual processings so as to make the loads of the processors uniform before the calculations are carried out in the processors as shown in FIG. 7.

As described above, the processing can be executed in each processor in accordance with the flowchart of the prior art shown in FIG. 2(B) (the processors are synchronized based on the output levels). Accordingly, this embodiment can be treated as an improved level sorting method and can be applied to the parallel computer of the prior art.

The synchronizing mechanism issues a command to start the execution of a next step upon detecting that the completion information has been given by all the processors and the network has become empty. Thus, the respective processors are allowed to start the execution of the next step immediately.

In the example of FIG. 3, as a result of the preprocessing, the individual processings a, b, c, d, e, f, g and h are scheduled as individual processings having the levels 4, 3 and 2, 1, 1, 2, 3, 4 respectively. If the processing times of the individual processings are assumed to be the same, the execution results are the same as shown in FIG. 4(B).

Since there are many cases where the execution times of the individual processings cannot be estimated accurately, it is necessary to synchronize all the processors with one another in each scheduled step.

In the aforementioned first and second embodiments, the respective individual processings are executed only once. However, in reality, the calculation is made by executing these processings repeatedly in many cases.

A third embodiment of the invention pertains to a case where the calculation is carried out repeatedly by the parallel computer. When there is an individual processing A which is calculated repeatedly as shown in FIG. 8, a repeat operation for one cycle is taken and set as a range $\alpha$, as shown in FIG. 9.

The operation within the range $\alpha$ is carried out repeatedly using the methods of the first and second embodiments shown in FIGS. 6 and 7, thereby realizing equivalently the repeat processing.

In the case where the repetitive portion is found further in the range $\alpha$, the method of this embodiment can be carried out recursively. In this case, the efficiency is bad even if the parallel computer is used, when the execution time for the range $\alpha$ is not sufficiently long.

Figure 8:
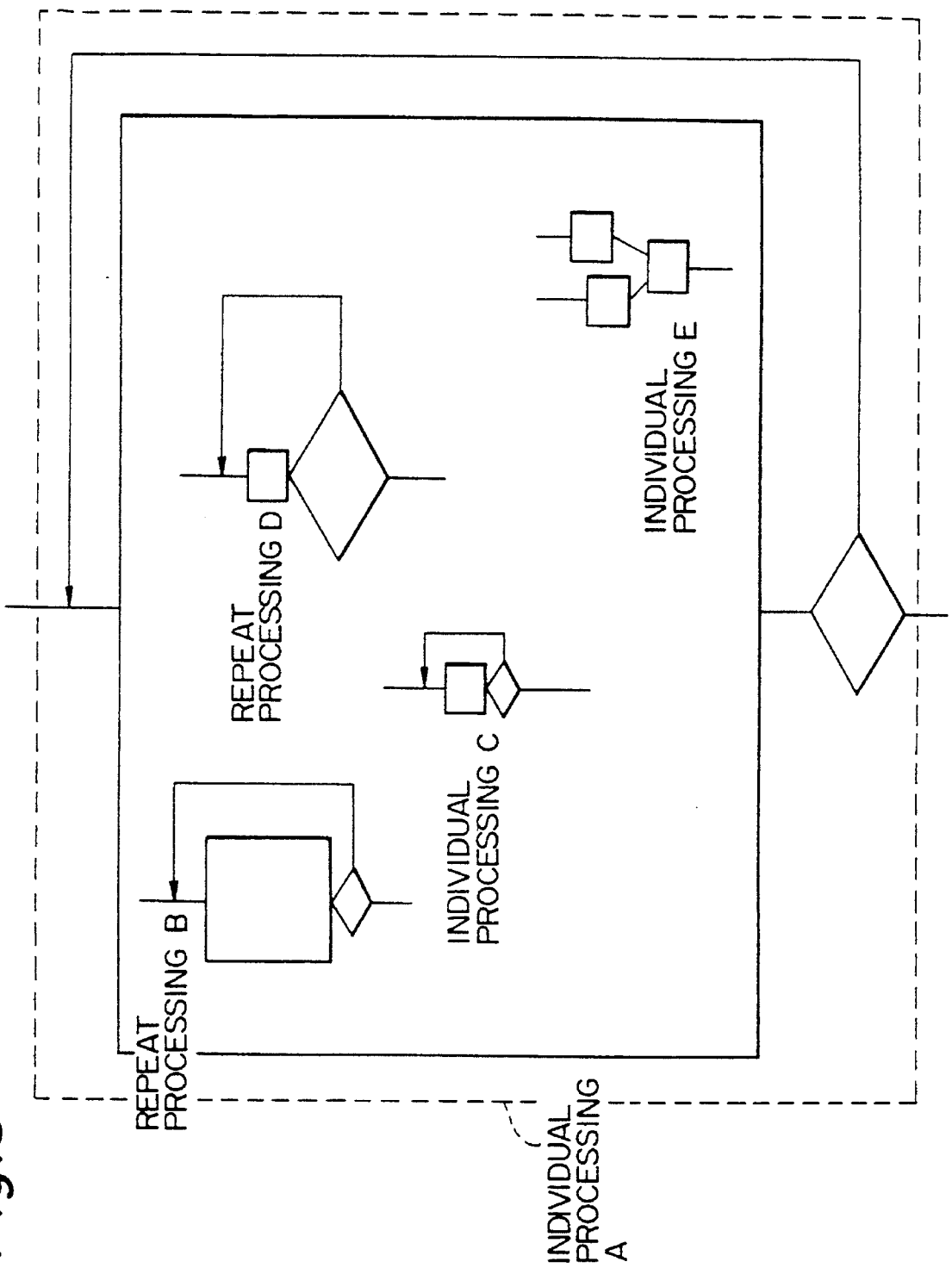
FIGS. 8 and 9 are views showing an outline of a third to seventh embodiments of the present invention.
Figure 9:
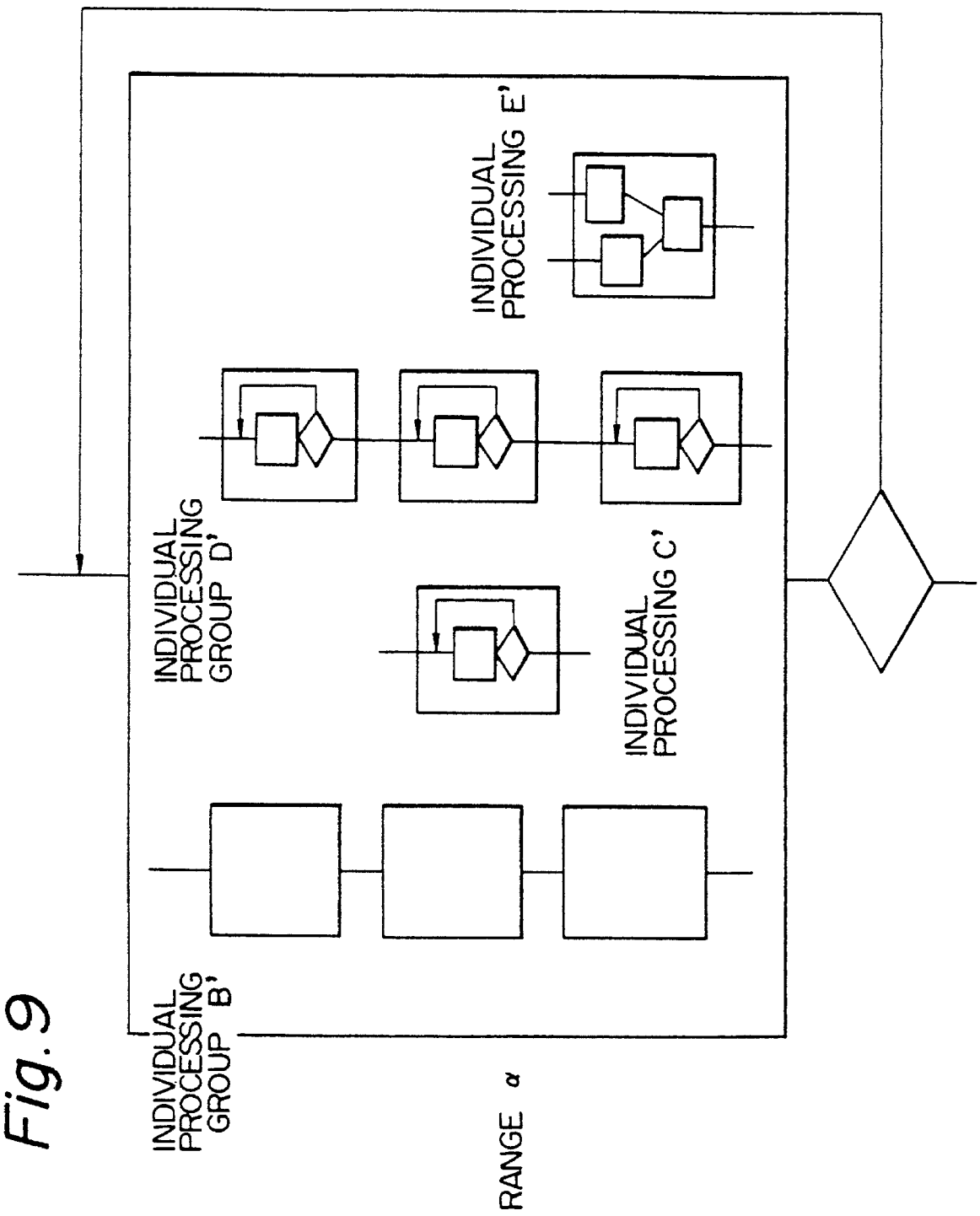

A fourth embodiment of the invention pertains to a case where there is an individual processing B which is a repeat processing, as shown in FIG. 8, in the entire calculation to be carried out or the range $\alpha$ taken out in the third embodiment. The repeat processing B is developed into individual processings as shown in an individual processing group B'.

The same individual processing in the repeat calculation is copied by the number of repetition. The copied individual processings are executed using the aforementioned methods of the first and second embodiments. Thereby, the respective individual processings are executed only once.

A fifth embodiment of the invention pertains to a case where there is an individual processing C which is a repeat processing, as shown in FIG. 8, in the entire calculation to be carried out or in the range $\alpha$ taken out in the third embodiment. The repeat processing C is redefined into a new individual processing as shown in an individual processing C' shown in FIG. 9. Thereby, the repeat processing C is executed as an individual processing.

A sixth embodiment of the invention pertains to a case where there is an individual processing D which is a repeat processing as shown in FIG. 8 in the entire calculation to be carried out or in the range $\alpha$ taken out in the third embodiment. The repeat processing D is divided into a suitable number of repeat processings as shown in an individual processing group D' shown in FIG. 9, and the divided processings are assumed as new individual processings. Thereby, the repeat processing D is executed as a plurality of individual processings.

A seventh embodiment of the invention pertains to a case where there are a plurality of processings whose execution time for one cycle is short, for example, as shown in an individual processing group E of FIG. 8. The individual processing group E is redefined as an individual processing E', as shown in FIG. 9, and the loads in the respective processors are made uniform by making the execution time of this individual processing even with those of other individual processings.

Though the individual processing group E of FIG. 8 each having the short execution time is redefined into the individual processing E' of FIG. 9, the individual processing whose execution time is as long as the individual processing A of FIG. 8 can be made even with those of the other individual processings by dividing the same into a plurality of individual processings.

In the case of the processing which is executed a small number of times and whose execution time for one cycle is as long as the individual processing B of FIG. 8, the execution time of this processing is made to be even with those of the other individual processings by dividing the repetitive portion into a plurality of individual processings as in the fourth embodiment.

Similarly, the execution time of the processing can be made even with those of the other individual processing by dividing into a plurality of individual processings or uniting a plurality of them into a single processing selecting and using the methods shown in the fifth and sixth embodiments.

For example, in the case of the processing which is repeated a small number of times and whose execution time for one cycle is short, the execution times of the individual processings can be made even using the method shown in the fifth or sixth embodiment. In the case of the processing which is repeated a large number of times and whose execution time for one cycle is short, the execution times of the individual processings can be made to be even using the method shown in the sixth embodiment.

The execution times of the respective processors are liable to be made even by using these methods, with the result that the waiting times of the other processors for the synchronization are shortened and the loads can be made uniform.

Figure 10:
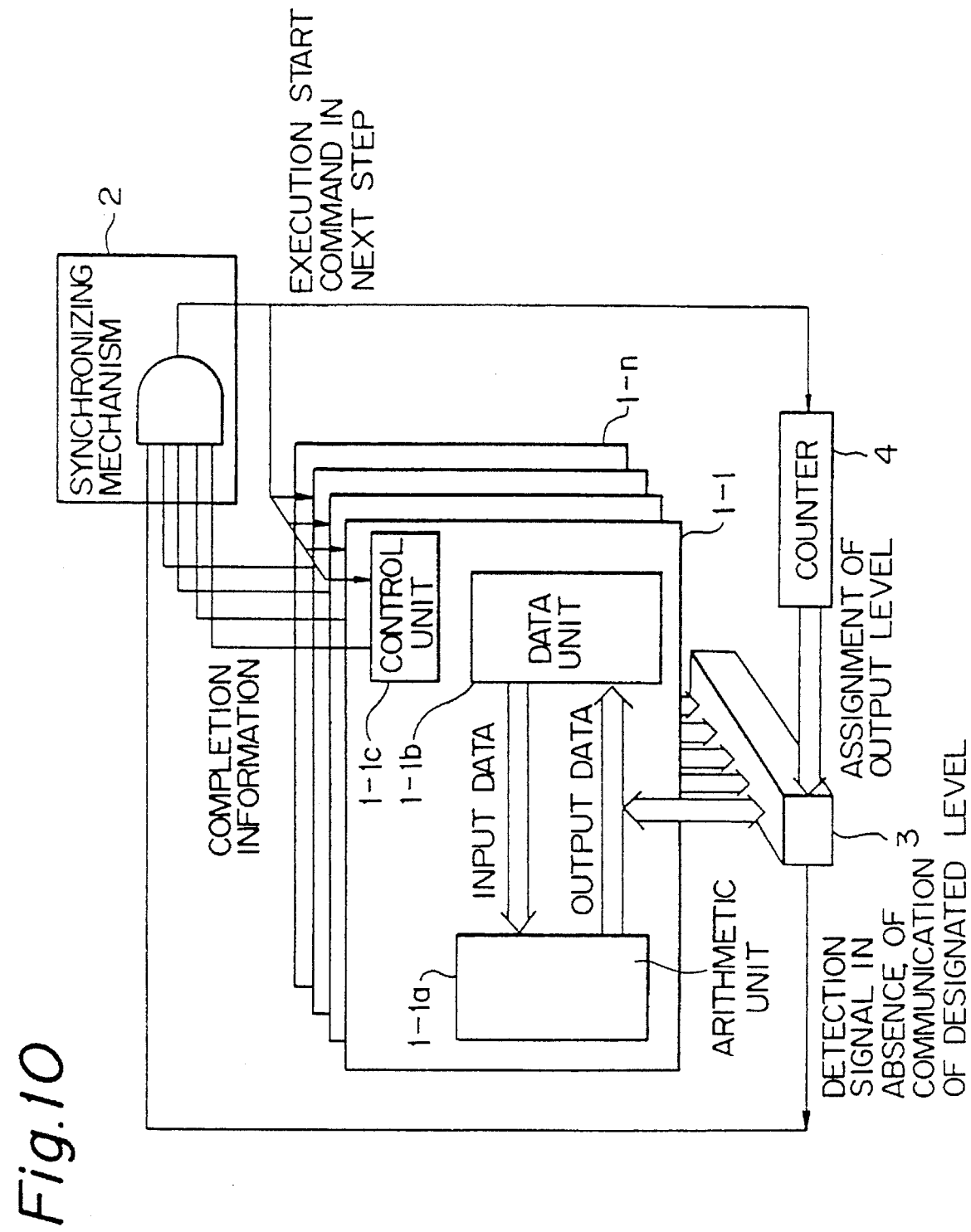
FIG. 10 is a view showing an eighth embodiment of the present invention in which a counter is added.

FIG. 10 is a diagram showing an eighth embodiment of 1-1$a$, the invention. A group of processors, 1-1 to n-1 are each provided with an arithmetic unit with a data unit 1-1$b$ a control unit 1-1$c$. Each processor 1-1 to 1-n is connected to a synchronizing mechanism 2, a network 3, and a counter 4. Like numerals designate like parts of the prior art shown in FIG. 1. In this embodiment, the counter 4 is added to the construction shown in FIG. 1.

The counter 4 shown in FIG. 10 counts an execution start command output from the synchronizing mechanism 2 and outputs a count value corresponding to a designated output level.

In FIG. 10, the count value corresponding to the output level and output from the counter 4 is fed to the network 3. The network 3 outputs a detection signal representing the absence of communication of the designated level in the case where the individual processing whose output level is the one designated by the counter 4 is not found in the network 3.

The synchronizing mechanism 2 outputs an execution start signal for a next step upon receipt of the completion information from the respective processors 1-1 to 1-n and the signal representing the absence of communication of the designated output level from the network 3.

In the first and second embodiments, the next step is started only after the network 3 becomes empty. However, since the means for detecting that the network 3 includes no individual processing, whose output level is the designated one, is provided in this embodiment, the execution of the next step can be started without waiting for the network 3 to become empty, even if the network 3 includes the individual processings of the different output levels.

Accordingly, the calculation speed can be improved compared to the first and second embodiments.

Figure 11:
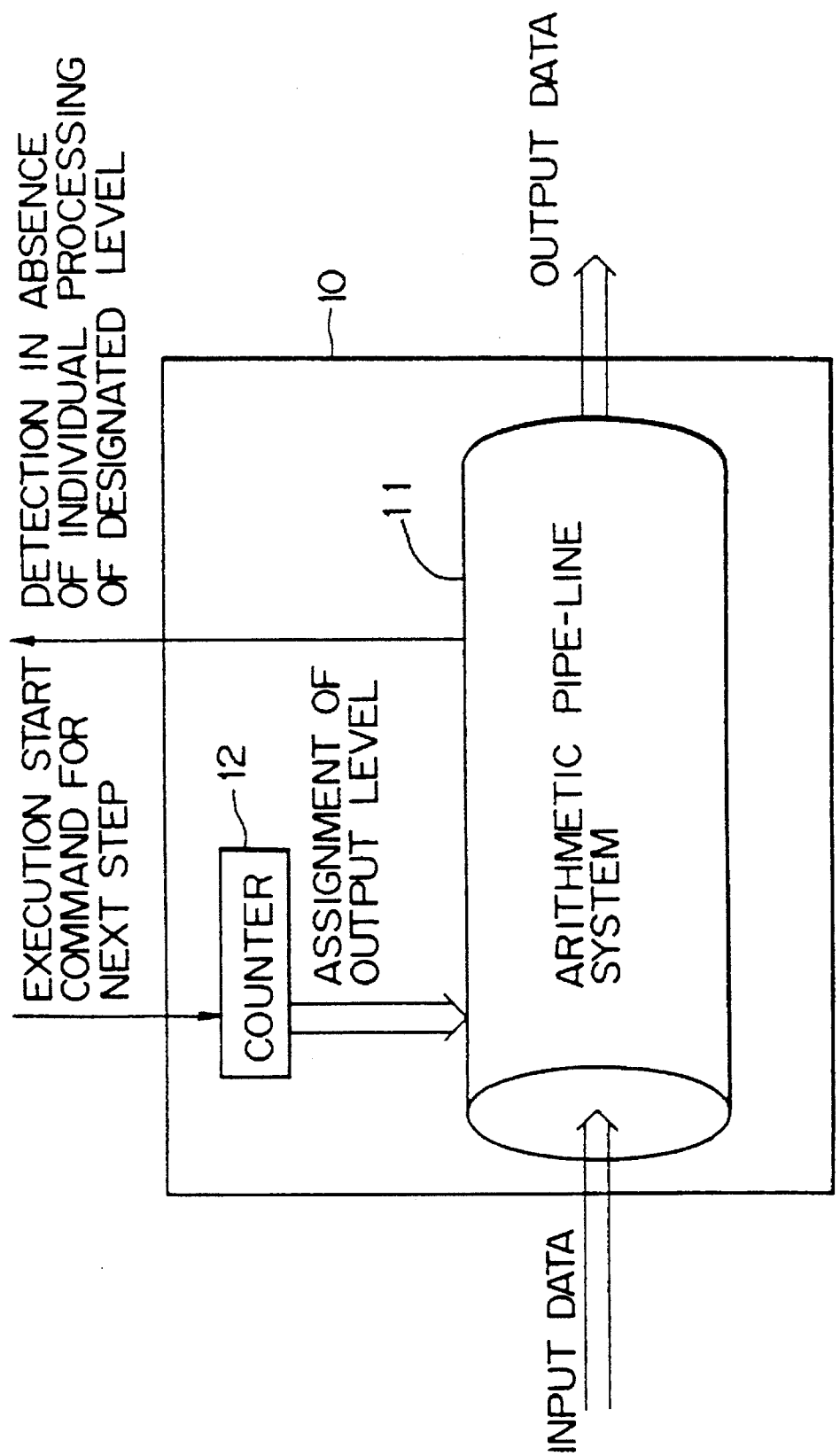
FIG. 11 is a view showing a ninth embodiment of the present invention in which the eighth embodiment is applied to a pipe-line type parallel computer.

FIG. 11 is a diagram showing a ninth embodiment of the invention in which the embodiment of FIG. 10 is applied to a pipe-line type parallel computer having an arithmetic unit 10, an arithmetic pipe-line system 11, and counter 12.

The arithmetic pipe-line system 11, in this figure, is a pipe-line system provided in each processor of the parallel computer. A next processing can be fed to the arithmetic pipe-line system 11 before a previously fed processing is completed. Similar to the counter 3 shown in FIG. 10, the counter 12 counts an execution start command output and outputs a count value corresponding to a designated output level.

In FIG. 11, the count value corresponding to the output level and output from the counter 12 is fed to the arithmetic pipe-line system 11. The arithmetic pipe-line system 11 outputs a detection signal representing the absence of the individual processing of the designated level in the case where the arithmetic pipe-line system 11 includes no individual processing whose output level is the one designated by the counter 11.

An illustrated synchronizing mechanism outputs an execution start command for a next step upon receipt of the signal representing the absence of the individual processing of the designated output level from the respective processors.

In the conventional pipe-line parallel computer, the respective processors are synchronized with one another by interrupting the inputs to the arithmetic pipe-line system so as to detect the completion of the processing of the arithmetic unit, and by waiting until the arithmetic pipe-line system becomes empty to detect the completion of the processing of the arithmetic unit. However, in this embodiment, the means for detecting that the arithmetic pipe-line system 11 includes no individual processing of the designated output level, is provided. Thus, the calculation speed can be improved compared to the conventional computer since the execution of the next step can be started without waiting for the arithmetic pipe-line system 11 to become empty, even if the pipe-line system 11 includes the individual processings of the different levels.

What is claimed is:

1. A uniform load distributing method for use in executing a plurality of individual processings in a parallel manner in a series of steps in a parallel computer having a plurality of processors for executing the individual processings, a network for conducting inter-processor communication, and a synchronizing mechanism to synchronize the plurality of processors by issuing an executing start command for a next step to all the processors when an indication of the completion of the individual processings performed in a current step is received from all the processors and the inter-processor communication related to the current step has been completed, said method comprising:

executing, by the plurality of processors in a current step of the series, the plurality of respective individual processings having the necessary input data and whose output data is needed in a next step of the series;

sending an indication of the completion of the execution, by each of the plurality of processors, to the synchronizing mechanism, immediately after the execution has been completed; and executing, until the execution start command for the next step is given by the synchronizing mechanism, the individual processings whose input data is ready and whose output data will be required at an earliest time following the completion of the next step.

2. A uniform load distributing method for use in executing a plurality of individual processings in a parallel manner in a series of steps in a parallel computer having a plurality of processors for executing the individual processings, a network for conducting inter-processor communication, and a synchronizing mechanism to synchronize the plurality of processors by issuing an execution start command for a next step to all the processors when an indication of the completion of the individual processings performed in a current step is received from all the processors and the inter-processor communication related to the current step has been completed, said method comprising:

determining an input level for each individual processing based on when input data necessary for said individual processings will be ready;

determining an output level for each individual processing based on when output data of the individual processings is required for other processings;

calculating, in each processor, a current step number by counting how many execution start commands the synchronizing mechanism has issued;

executing only the individual processings whose output levels are equal to the current step number; and executing in each processor while waiting for the other processors to complete the execution of the individual processings, the individual processings whose input levels are not larger than the current step number and whose output levels are larger than the current step number.

3. A uniform load distributing method for use in executing a plurality of individual processings in a parallel manner in a series of steps in a parallel computer having a plurality of processors for executing the individual processings, a network for conducting inter-processor communication, and a synchronizing mechanism to synchronize the plurality of processors by issuing an execution start command for a next step to all the processors when an indication of the completion of the individual processings performed in a current step is received from all the processors and the inter-processor communication related to the current step has been completed, said method comprising:

determining an input level for each individual processor based on when input data necessary for each processings will be ready;

determining an output level for each individual processing based on when output data from the individual processing is required for other processings;

estimating an execution time for each of the individual processings to be executed;

calculating a step number by counting the number of times the synchronizing mechanism has issued an execution start command;

scheduling, for each processor, each of the individual processings whose output levels are equal to the step number and which have not been scheduled yet as an individual processing in each processor in each step;

estimating an overall execution time for the current step for each processor based on the estimated execution time of each of the individual processors;

calculating the waiting times of the respective processors for synchronization in the current step, based on a maximum value of the estimated overall execution time of all the processors;

scheduling the individual processing whose input levels are not larger than the step number, whose output levels are larger than the step number, and which are not scheduled yet as individual processings for the current step in the processors during the waiting times; and executing the scheduled individual processings while synchronizing the processors in each step.

4. A uniform load distributing method according to claim 1, wherein said method further comprises:

developing an individual processing which is to be executed repeatedly into a plurality of individual processings corresponding to a number of times the individual process is to be executed; and executing the plurality of individual processings.

5. A method according to claim 1, wherein said method further comprises:

defining a single individual processing which is to be executed repeatedly as an individual processing; and executing the newly defined individual processing only once, whereby the individual processing to be executed is repeatedly executed during the course of the single individual processing.

6. A method according to claim 1, wherein said method further comprises:

dividing an individual processing which is to be executed repeatedly into a plurality of individual processings; and executing the plurality of newly defined individual processing.

7. A method according to claim 1, wherein said method further comprises:

designating a plurality of individual processings having a short execution time; and defining and executing the plurality of the designated individual processings as a unit in an individual processing having an execution time approximately equal to the execution times of the other individual processings in the current step.

8. A method according to claim 1, wherein said method further comprises:

designating the individual processing having a long execution time; and dividing the designated individual processing into a plurality of processings each having an execution time approximately equal to the execution times of the other individual processings in the current step;

defining and executing the plurality of divided designated individual processings as a plurality of individual processings.

9. A method according to claim 2, wherein said method further comprises:

detecting whether data of a designated output level is transferred in the network; and starting the execution of the next step when an indication of the completion of the current processing from all the processors has been issued and no data of the designated output level is being transferred in the network.

10. A method according to claim 2, wherein said method further comprises:

detecting whether parallel computer is a a pipe-line type parallel computer having a pipe-line system to transfer the output data; and starting the execution of the next step when no data of the designated output level is being transferred in the pipe-line system.

11. A uniform load distributing method according to claim 2, wherein said method further comprises:

developing an individual processing which is to be executed repeatedly into a plurality of individual processings corresponding to a number of times the individual process is to be executed; and executing the plurality of individual processings.

12. A method according to claim 2, wherein said method further comprises:

defining an individual processing which is to be executed repeatedly as a single individual processing; and executing the newly defined individual processing only once, whereby the individual processing to be executed is repeatedly executed during the course of the single individual processing.

13. A method according to claim 2, wherein said method further comprises:

dividing an individual processing which is to be executed repeatedly into a plurality of individual processings; and executing the plurality of newly defined individual processing.

14. A method according to claim 2, wherein said method further comprises:

designating a plurality of individual processings having a short execution time; and defining and executing the plurality of the designated individual processings as a unit in an individual processing having an execution time approximately equal to the execution times of the other individual processings in the current step.

15. A method according to claim 2, wherein said method further comprises:

designating the individual processing having a long execution time; and dividing the designated individual processing into a plurality of processings each having an execution time approximately equal to the execution times of the other individual processings in the current step;

defining and executing the plurality of divided designated individual processings as a plurality of individual processings.

16. A uniform load distributing method according to claim 3, wherein said method further comprises:

developing an individual processing which is to be executed repeatedly into a plurality of individual processings corresponding to a number of times the individual process is to be executed; and executing the plurality of individual processings.

17. A method according to claim 3, wherein said method further comprises:

defining an individual processing which is to be executed repeatedly as a single individual processing; and executing the newly defined individual processing only once, whereby the individual processing to be executed is repeatedly executed during the course of the single individual processing.

18. A method according to claim 3, wherein said method further comprises:

dividing an individual processing which is to be executed repeatedly into a plurality of individual processings; and executing the plurality of newly defined individual processing.

19. A method according to claim 3, wherein said method further comprises:

designating a plurality of individual processings having a short execution time; and defining and executing the plurality of the designated individual processings as a unit in an individual processing having an execution time approximately equal to the execution times of the other individual processings in the current step.

20. A method according to claim 3, wherein said method further comprises:

designating the individual processing having a long execution time; and dividing the designated individual processing into a plurality of processings each having an execution time approximately equal to the execution times of the other individual processings in the current step;

defining and executing the plurality of divided designated individual processings as a plurality of individual processings.

21. A method according to claim 1 wherein the individual processings are to be performed once.

22. A method according to claim 2 wherein the individual processings are to be performed once.

23. A method according to claim 3 wherein the individual processings are to be performed once.

* * * * *

UNITED STATES PATENT AND TRADEMARK OFFICE
CERTIFICATE OF CORRECTION

PATENT NO. : 5,535,387
DATED : July 9, 1996
INVENTOR(S) : Hidetoshi MATSOUKA, et al.

It is certified that error appears in the above-indentified patent and that said Letters Patent is hereby corrected as shown below:

Title page, item [57],
 In the Abstract, line 14, after "executing" insert -- the individual processings --.
 In the Abstract, line 15, after "executing" delete "the individual processings.

Column 2
 Line 29, delete ", and " insert -- ; --.
 Line 51, after "1-1b" insert -- and --.

Column 4
    Line 3, after "]" insert -- , --.
    Line 30, after "executed" insert -- , --.

Column 11
    Line 2, change "3," to -- 3 and --.

Column 12
    Line 34, delete "1-1a,".
    Line 35, after "unit", first occurrence, insert -- 1-1a --; delete second occurrence
of "with"; after "1-1b" insert -- , --.

Signed and Sealed this

Eighteenth Day of March, 1997

Attest:

BRUCE LEHMAN

*Attesting Officer*    *Commissioner of Patents and Trademarks*